US012510113B2

(12) United States Patent
Imura

(10) Patent No.: US 12,510,113 B2
(45) Date of Patent: Dec. 30, 2025

(54) SLIDING COMPONENT

(71) Applicant: Eagle Industry Co., Ltd., Tokyo (JP)

(72) Inventor: Tadatsugu Imura, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 257 days.

(21) Appl. No.: 17/602,137

(22) PCT Filed: Apr. 7, 2020

(86) PCT No.: PCT/JP2020/015696
§ 371 (c)(1),
(2) Date: Oct. 7, 2021

(87) PCT Pub. No.: WO2020/209258
PCT Pub. Date: Oct. 15, 2020

(65) Prior Publication Data
US 2022/0145931 A1 May 12, 2022

(30) Foreign Application Priority Data
Apr. 9, 2019 (JP) ................................. 2019-074466

(51) Int. Cl.
*F16J 15/34* (2006.01)
*F16C 17/04* (2006.01)
(Continued)

(52) U.S. Cl.
CPC ............ *F16C 17/045* (2013.01); *F16C 33/74* (2013.01); *F16J 15/164* (2013.01); *F16J 15/34* (2013.01); *F16C 2300/02* (2013.01)

(58) Field of Classification Search
CPC .......... F16J 15/164; F16J 15/34; F16J 15/342; F16J 15/3424; F16J 15/3412
See application file for complete search history.

(56) References Cited

U.S. PATENT DOCUMENTS 3,109,658 A * 11/1963 Barrett .................. F16J 15/342
277/400
5,441,283 A * 8/1995 Pecht .................. F16J 15/3412
277/400
(Continued)

FOREIGN PATENT DOCUMENTS

CN         1259681       1/2000    ............. G02B 26/10
CN         1401924 A  *  3/2003
(Continued)

OTHER PUBLICATIONS

First Office Action issued in Chinese Patent Appln. Serial No. 202080026547.2, dated Nov. 11, 2022, with English translation, 15 pages.
(Continued)

*Primary Examiner* — Christine M Mills
*Assistant Examiner* — L. Susmitha Koneru
(74) *Attorney, Agent, or Firm* — HAYES SOLOWAY P.C.

(57) ABSTRACT

An annular sliding component disposed at a relative rotation point of a rotating machine, includes a plurality of positive pressure generation grooves arranged side by side in a circumferential direction on a sliding surface of the sliding component. The positive pressure generation grooves are configured for generating positive pressure by a sealing target fluid on the sealing target fluid side being introduced during the relative rotation of the sliding component and a sliding component. The positive pressure generation grooves have a plurality of leading edge portions at leading edges on a downstream side in a direction of the relative rotation. The plurality of leading edge portions are arranged side by side in the circumferential direction. At least part of the plurality of leading edge portions is disposed at different radial positions.

31 Claims, 11 Drawing Sheets

(51) Int. Cl.
  *F16C 33/74* (2006.01)
  *F16J 15/16* (2006.01)

(56) References Cited

U.S. PATENT DOCUMENTS

| | | | | |
|---|---|---|---|---|
| 6,152,452 | A | 11/2000 | Wang | 277/400 |
| 9,784,372 | B2 * | 10/2017 | Iguchi | F16J 15/3412 |
| 9,989,153 | B2 | 6/2018 | Colombo et al. | F16J 15/34 |
| 10,704,417 | B2 | 7/2020 | Tokunaga et al. | F01D 25/16 |
| 2007/0177832 | A1 | 8/2007 | Gotoh et al. | 384/107 |
| 2015/0345641 | A1 | 12/2015 | Lattin | F16J 15/342 |
| 2018/0073394 | A1 * | 3/2018 | Tokunaga | F16J 15/3412 |
| 2018/0106375 | A1 | 4/2018 | Inoue et al. | F16J 15/342 |
| 2018/0195618 | A1 | 7/2018 | Itadani et al. | F16J 15/3416 |
| 2019/0376558 | A1 | 12/2019 | Kimura et al. | F16C 33/10 |
| 2021/0054935 | A1 | 2/2021 | Kimura et al. | F16J 15/34 |
| 2022/0120313 | A1 * | 4/2022 | Ou | F16C 33/741 |

FOREIGN PATENT DOCUMENTS

| | | | | |
|---|---|---|---|---|
| CN | 106763779 | 5/2017 | | F16J 15/16 |
| CN | 107110369 | 8/2017 | | F16J 15/34 |
| CN | 107314112 | 11/2017 | | F16J 15/35 |
| CN | 107709584 | 2/2018 | | F16J 15/34 |
| EP | 0637706 | 5/1994 | | F16J 15/34 |
| EP | 0672852 | 2/1995 | | F16J 15/34 |
| EP | 1018605 | 7/2000 | | F16C 17/10 |
| EP | 2740974 | 6/2014 | | F16J 15/34 |
| EP | 3284981 | 2/2018 | | F16J 15/34 |
| EP | 3901497 | 10/2021 | | F16J 15/34 |
| JP | H0478379 | 3/1992 | | F16J 15/34 |
| JP | H5-164249 | 6/1993 | | F16J 15/34 |
| JP | 2014187871 | 10/2014 | | H02K 7/08 |
| JP | 2019-7622 | 1/2019 | | F16J 15/34 |
| KR | 1020170083015 | 7/2017 | | F16J 15/34 |
| KR | 1020170137727 | 12/2017 | | F16J 15/34 |
| WO | 2005078295 | 8/2005 | | F16C 33/10 |
| WO | 2018139231 | 8/2018 | | F16J 15/34 |
| WO | 2018139232 | 8/2018 | | F16J 33/10 |

OTHER PUBLICATIONS

Extended European Search Report issued in EPO Patent Appln. Serial No. 20787693.9-1009, dated Nov. 11, 2022, 10 pages.
International Search Report and Written Opinion issued in PCT/JP2020/015696, dated Jun. 9, 2020, with English translation, 13 pages.
International Preliminary Report on Patentability issued in PCT/JP2020/015696, dated Oct. 21, 2021, with English translation, 6 pages.
Korean Official Action dated Sep. 18, 2023 issued in Korean Application Serial No. 10-2021-7035587, with translation, 10 pages.
Korean Official Action dated Apr. 2, 2024 issued in Korean Application Serial No. 10-2023-7039120, with translation, 15 pages.

* cited by examiner (A)

SLIDING COMPONENT

TECHNICAL FIELD

The present invention relates to sliding components that rotate relative to each other and are used for, for example, a shaft sealing device shaft-sealing a rotary shaft of a rotating machine in the automotive seal field, the general industrial machinery seal field, or another seal field or a bearing of a machine in the automotive bearing field, the general industrial machinery bearing field, or another bearing field.

BACKGROUND ART

A mechanical seal as an example of a shaft sealing device preventing sealing target liquid leakage includes a pair of annular sliding components rotating relative to each other and having sliding surfaces sliding with each other. In recent years and in such mechanical seals, it has been desired for environmental measures or the like to reduce the energy that is lost due to sliding. In this regard, the sliding surface of the sliding component may be provided with a positive pressure generation groove communicating with the high-pressure sealing target liquid side and blocked at one end on the sliding surface.

For example, in the mechanical seal that is illustrated in Patent Citation 1, a plurality of positive pressure generation grooves having an opening portion communicating with a sealing target fluid side and extending at an angle to the rotation-direction downstream side while facing the atmospheric side are disposed along the circumferential direction in the sliding surface of one sliding component. According to this, during the relative rotation of the sliding component, the sealing target liquid is introduced into the positive pressure generation groove, the sealing target liquid concentrates on the leading edge portion positioned at the downstream-side leading edge of the positive pressure generation groove, and positive pressure generation and inter-sliding surface liquid film generation occur as a result. In addition, the sliding surfaces are slightly separated from each other, and thus lubricity is improved and friction reduction is realized.

In addition, in the mechanical seal illustrated in Patent Citation 2, a plurality of V-shaped grooves forming a V shape with tip portions facing the rotation-direction downstream side are disposed over the circumferential direction in the sliding surface of one sliding component. The side that communicates with a sealing target liquid side as one of the two sides constituting the V-shaped groove functions as a positive pressure generation groove, and the tip portion where the two sides of the V-shaped groove intersect is positioned in the leading edge portion on the downstream side in the relative rotation direction. According to this, the sealing target liquid concentrates on the tip portion of the V-shaped groove, a liquid film of the sealing target liquid is formed, and lubricity is improved as in Patent Citation 1.

CITATION LIST

Patent Literature

Patent Citation 1: JP H5-164249 A (Page 4, FIGS. 2 and 3)
Patent Citation 2: U.S. Pat. No. 6,152,452 (Page 14, FIG. 8)

SUMMARY OF INVENTION

Technical Problem

However, in Patent Citation 1, the leading edge portions of the plurality of positive pressure generation grooves disposed along the circumferential direction of the sliding surface are at the same position in the radial direction. In other words, the plurality of leading edge portions line up on the same circumference with exception. Likewise, in Patent Citation 2, the tip portions of the plurality of V-shaped grooves disposed along the circumferential direction of the sliding surface line up on the same circumference with exception. Accordingly, in Patent Citations 1 and 2, positive pressure is generated around the leading edge portions and the tip portions lining up on the same circumference, and thus the radial pressure gradient of the sliding surface becomes large and it becomes difficult to form a uniform liquid film in the wide region of the sliding surface. As a result, high lubricity may not be obtained on the entire sliding surface and the sliding surface may be poorly lubricated. In addition, in Patent Citation 2, the liquid film of the sealing target liquid is formed around the tip portions lining up on the same circumference, and thus the gas-liquid interface between the sealing target liquid on the sealing target liquid side and the atmosphere on the leak side is problematically fixed in a specific narrow range in the radial direction during the relative rotation of the sliding component.

The present invention has been made in view of such problems, and an object of the present invention is to provide a sliding component capable of obtaining high lubricity over the entire surface of a sliding surface.

Solution to Problem

In order to solve the above problem, a sliding component according to the present invention is a sliding component formed in an annular shape and disposed at a relative rotation point of a rotating machine, the sliding component including a plurality of first positive pressure generation grooves arranged side by side in a circumferential direction on a sliding surface of the sliding component, the plurality of first positive pressure generation grooves being configured for generating positive pressure by a sealing target fluid on a sealing target fluid side which is introduced during the relative rotation of the sliding component, the first positive pressure generation grooves having a plurality of leading edge portions at leading edges on a downstream side in a direction of the relative rotation, the plurality of leading edge portions being arranged side by side in the circumferential direction, at least part of the plurality of leading edge portions being disposed at different radial positions. According to the aforesaid feature of the present invention, during the relative rotation of the sliding component, the sealing target fluid flows to the relative rotation-direction downstream side of each of the first positive pressure generation groove and concentrates on the leading edge portion, leading to positive pressure generation. Since the leading edge portions of the first positive pressure generation grooves are disposed at different radial positions at least in part, the positive pressure on the sliding surface is generated at different radial positions along the circumferential direction. Since the radial pressure gradient on the sliding surface becomes small, a uniform liquid film is likely to be formed in the wide region of the sliding surface. Accordingly, the lubricity of the sliding surface attributable to the sealing target fluid is improved.

It may be preferable that the plurality of leading edge portions arranged side by side are be regularly disposed along the circumferential direction. According to this preferable configuration, the fluid film of the sealing target fluid is formed at regularly disposed positions during the relative rotation of the sliding component, and thus the lubricity is improved.

It may be preferable that the plurality of leading edge portions arranged side by side have radial positions gradually changing along the circumferential direction and be disposed in a wave shape. According to this preferable configuration, the fluid film of the sealing target fluid is formed in a wave shape during the relative rotation of the sliding component, and thus the lubricity is improved.

It may be preferable that each of the plurality of first positive pressure generation grooves has an opening portion communicating with the sealing target fluid side. According to this preferable configuration, during the relative rotation of the sliding component, the sealing target fluid is easily introduced from the sealing target fluid side in the opening portion of the first positive pressure generation groove, and thus the fluid film of the sealing target fluid is easily formed in the leading edge portion and the lubricity of the sliding surface is improved.

It may be preferable that each of the plurality of first positive pressure generation grooves extends at an angle to the downstream side in the relative rotation direction while facing a leak side, and the sliding surface is provided with a negative pressure generation groove extending so as to be continuous from a leak-side end portion of each of the plurality of first positive pressure generation grooves and at an angle to an upstream side in the relative rotation direction while facing the leak side. According to this preferable configuration, during the relative rotation of the sliding component, the fluid film of the sealing target fluid formed in the leading edge portion is suctioned in by the negative pressure generation groove with a relatively negative pressure, and thus it is possible to prevent the sealing target fluid from leaking to the leak side and improve the sealability of the sliding component.

It may be preferable that a land extending over the circumferential direction is provided on the leak side of the sliding surface as compared with the negative pressure generation groove. According to this preferable configuration, the leak-side end portion of the negative pressure generation groove is blocked by the land, and thus it is possible to prevent the sealing target fluid from leaking to the leak side when the sliding component is stationary.

It may be preferable that the land on the leak side as compared with the negative pressure generation groove has a constant radial width over the circumferential direction. According to this preferable configuration the radial position of the leak-side end portion of the negative pressure generation groove is constant over the circumferential direction, and thus manufacturing is facilitated.

It may be preferable that the plurality of leading edge portions arranged side by side and a bent portion on the upstream side in the relative rotation direction where the first positive pressure generation groove and the negative pressure generation groove intersect, have radial positions gradually changing along the circumferential direction and be disposed in a wave shape. According to this preferable configuration, the leading edge portion and the bent portion are disposed on a wave-shaped virtual curve, and thus manufacturing is facilitated.

It may be preferable that the sliding surface is provided with a second positive pressure generation groove independent of the first positive pressure generation groove on a leak side as compared with the first positive pressure generation groove and generating positive pressure by a fluid on the leak side as compared with the first positive pressure generation groove being introduced during the relative rotation of the rotating machine and the second positive pressure generation groove is provided with a leading edge portion at the leading edge on the downstream side in the relative rotation direction. According to this preferable configuration, during the relative rotation of the sliding component, the fluid on the leak side flows to the relative rotation-direction downstream side of the second positive pressure generation groove and concentrates on the leading edge portion of the second positive pressure generation groove to lead to positive pressure generation, and thus it is possible to repel the sealing target fluid approaching the vicinity of the leading edge portion of the second positive pressure generation groove from the sealing target fluid side and prevent the sealing target fluid from leaking to the leak side.

It may be preferable that the second positive pressure generation groove is disposed so as to correspond in number and position to the first positive pressure generation groove. According to this preferable configuration, the second positive pressure generation grooves can be machined in accordance with the number and positions of the first positive pressure generation grooves and are easy to manufacture.

It may be preferable that a land extending over the circumferential direction is provided between the first positive pressure generation groove and the second positive pressure generation groove in the radial direction. According to this preferable configuration, the first positive pressure generation groove and the second positive pressure generation groove can be separated from each other and the functions of both during the relative rotation can be clarified.

It may be preferable that the land provided between the first positive pressure generation groove and the second positive pressure generation groove in the radial direction has a radial width constant over the circumferential direction. According to this preferable configuration, the leading edge portion of the second positive pressure generation groove is separated from the leading edge portion to the leak side by a constant dimension. The leading edge portion of the second positive pressure generation groove where positive pressure is generated during the relative rotation is disposed at positions with different diameter lengths in the circumferential direction, and thus it is possible to prevent the sealing target fluid flowing from the fluid film generated in the leading edge portion of the first positive pressure generation groove during the relative rotation from entering the leak side.

It may be preferable that the plurality of leading edge portions arranged side by side and a corner portion positioned on a relative rotation-direction upstream side of a leak-side end portion of the first positive pressure generation groove have radial positions gradually changing along the circumferential direction and be disposed in a wave shape. According to this preferable configuration, the leading edge portion and the corner portion are disposed on a wave-shaped virtual curve, and thus manufacturing is facilitated.

DESCRIPTION OF EMBODIMENTS

Figure 1:
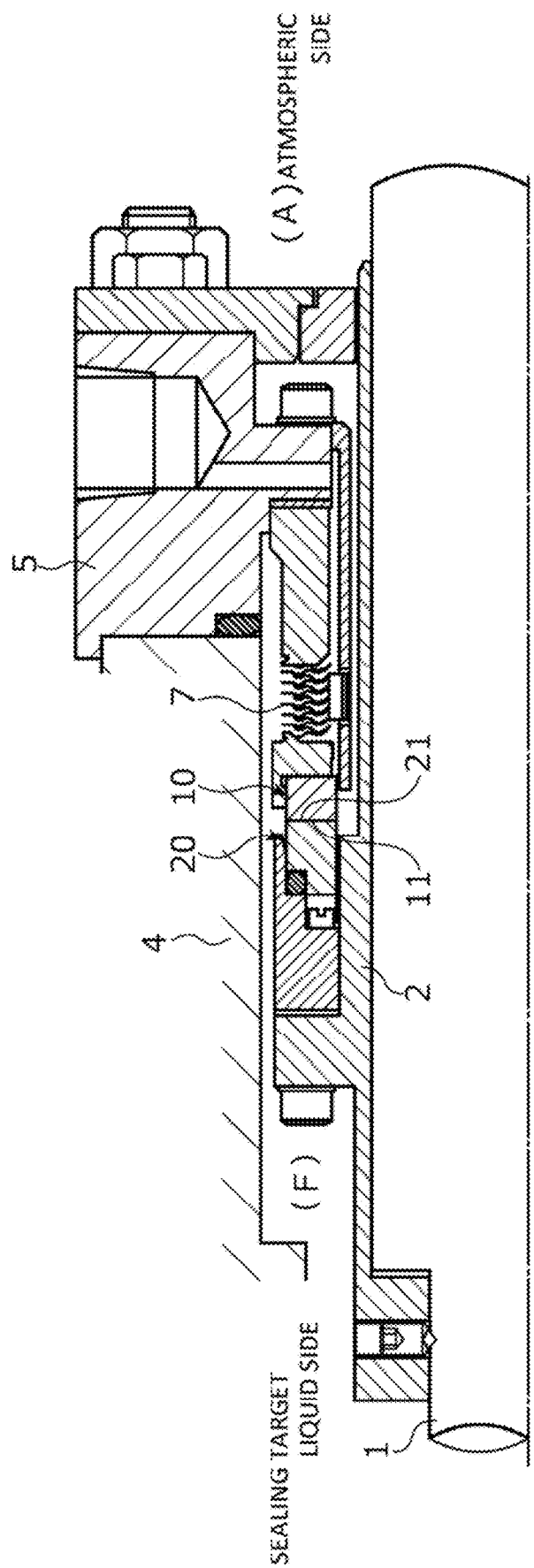
FIG. 1 is a vertical cross-sectional view illustrating an example of the mechanical seal including a sliding component according to a first embodiment of the present invention.

Modes for implementing the sliding component according to the present invention will be described below based on embodiments.

First Embodiment

The sliding component according to the first embodiment of the present invention will be described with reference to FIGS. 1 to 3. It should be noted that a mode in which the sliding component is a mechanical seal will be described as an example in the present embodiment. In addition, in the following description, the outer diameter side of the sliding component constituting the mechanical seal is a sealing target liquid side (high-pressure side) and the inner diameter side is an atmospheric side (leak side, low-pressure side). It should be noted that the present invention is not limited thereto, the sealing target liquid side may be the low-pressure side and the leak side may be the high-pressure side, and the sealing target fluid is not limited to a liquid and may be a gas, examples of which include the atmosphere. In addition, for convenience of description, dots may be added to, for example, the grooves formed in the sliding surface in the drawings.

The mechanical seal for general industrial machine illustrated in FIG. 1 is an inside-type mechanical seal that seals a sealing target liquid F to leak toward the atmospheric side from the sealing target liquid side of a sliding surface. The mechanical seal mainly includes a rotating seal ring 20, which is an annular sliding component provided on a rotary shaft 1 in a state of being rotatable together with the rotary shaft 1 via a sleeve 2, and an annular stationary seal ring 10, which is a sliding component provided on a seal cover 5 fixed to a housing 4 of an attachment target device in a non-rotating state and a state of being movable in the axial direction. A sliding surface 11 of the stationary seal ring 10 and a sliding surface 21 of the rotating seal ring 20 slide closely with each other by a bellows 7 urging the stationary seal ring 10 in the axial direction. It should be noted that the sliding surface 21 of the rotating seal ring 20 may form a flat surface or may be provided with a recessed portion.

The stationary seal ring 10 and the rotating seal ring 20 are typically formed of a combination of SiC (hard material) or a combination of SiC (hard material) and carbon (soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (coating material), a composite material, and the like can also be applied.

Figure 2:
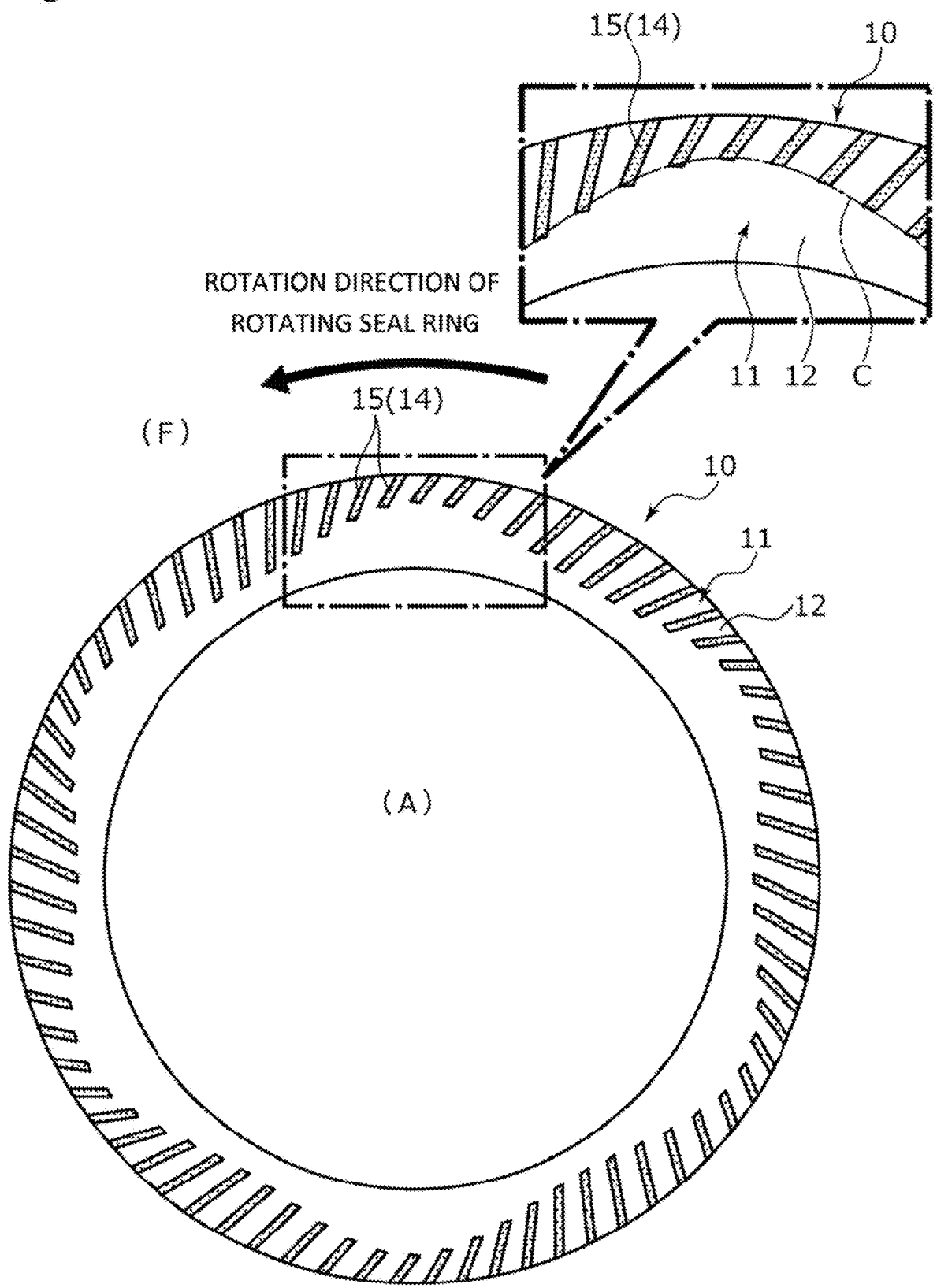
FIG. 2 is a diagram in which the sliding surface of a stationary seal ring is viewed from the axial direction in the first embodiment.

As illustrated in FIG. 2, the rotating seal ring 20 slides relative to the stationary seal ring 10 as indicated by the arrow and a plurality of dynamic pressure generation mechanisms 14 are evenly arranged along the circumferential direction of the stationary seal ring 10 on the sliding surface 11 of the stationary seal ring 10. The part of the sliding surface 11 other than the dynamic pressure generation mechanism 14 is a land 12 forming a flat surface.

Figure 3:
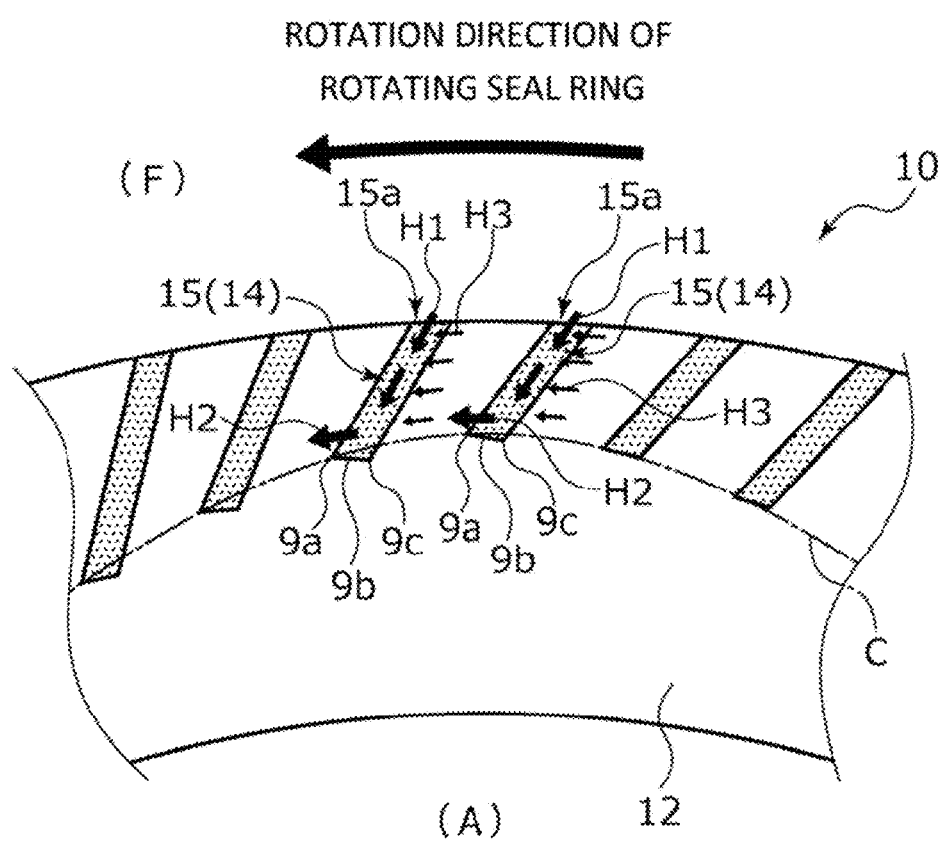
FIG. 3 is an enlarged view of a main part of the sliding surface of the stationary seal ring during relative rotation in the first embodiment.

Next, the dynamic pressure generation mechanism 14 will be outlined with reference to FIGS. 2 and 3. It should be noted that the left side of the page of FIG. 3 is the downstream side of the sealing target liquid F and the right side of the page of FIG. 3 is the upstream side of the sealing target liquid F in the following description, when the stationary seal ring 10 and the rotating seal ring 20 are relatively rotated.

The dynamic pressure generation mechanism 14 has a positive pressure generation groove 15 provided with an opening portion 15a open to and communicating with the sealing target liquid side, inclined to the downstream side while facing the atmospheric side, and linearly recessed to an atmosphere-side end portion 9b blocked as a leak-side end portion. A leading edge portion 9a is disposed at the downstream-side leading edge of the atmosphere-side end portion 9b. The land 12 is provided on the atmospheric side as compared with the positive pressure generation groove 15, and thus it is possible to prevent the sealing target liquid F from leaking to the atmospheric side when the rotating seal ring 20 is stationary. In addition, the radial positions of the leading edge portions 9a of a plurality of the positive pressure generation grooves 15 arranged side by side gradually change along the circumferential direction and the leading edge portions 9a are disposed on a smooth and continuous virtual curve C having a sine wave shape over the circumferential direction. It should be noted that the present invention is not limited to the present embodiment. Although not particularly illustrated, a corner portion 9c positioned on the upstream side of the atmosphere-side end portion 9b of the positive pressure generation groove 15 as well as the leading edge portion 9a may be disposed on the virtual curve C. Further, it should be noted that the virtual curve C has periodicity, the present invention is not limited thereto, and the virtual curve C may lack periodicity.

It should be noted that the plurality of positive pressure generation grooves 15 are provided such that the opening portions 15a are evenly disposed along the circumferential direction and the inclination angles of the positive pressure generation grooves 15 are different and thus the plurality of positive pressure generation grooves 15 can be arranged side by side in a narrow region. However, the present invention is not limited thereto. The plurality of positive pressure generation grooves 15 may be provided such that the opening portions 15a are unevenly disposed along the circumferential direction and the inclination angles of the positive pressure generation grooves 15 are constant.

Next, the operation of the stationary seal ring 10 and the rotating seal ring 20 during the relative rotation will be described. First, during the non-operation of a general industrial machine and non-rotation of the rotating seal ring 20, capillarity causes the sealing target liquid F on the sealing target liquid side as compared with the sliding surfaces 11 and 21 to slightly enter between the sliding surfaces 11 and 21 and the dynamic pressure generation mechanism 14 is filled with the sealing target liquid F that has flowed in from the opening portion 15a of the positive pressure generation groove 15. It should be noted that the sealing target liquid F is higher in viscosity than a gas and thus the amount of leakage from the dynamic pressure generation mechanism 14 to the atmospheric side is extremely small when the general industrial machine is stopped.

Next, when the rotating seal ring 20 rotates with respect to the stationary seal ring 10 as illustrated in FIG. 3, the flow of the sealing target liquid F on the sealing target liquid side introduced from the opening portion 15a of the positive pressure generation groove 15 toward the leading edge portion 9a is generated as indicated by an arrow H1. Accordingly, dynamic pressure is generated in the positive pressure generation groove 15. It should be noted that the positive pressure in the positive pressure generation groove 15 gradually increases from the opening portion 15a side, which is the upstream side, toward the leading edge portion 9a on the downstream side.

In other words, the pressure is highest in the vicinity of the leading edge portion 9a positioned at the downstream-side leading edge of the positive pressure generation groove 15, the sliding surfaces 11 and 21 are separated from each other, and a liquid film of the sealing target liquid F is formed on the sealing target liquid side between the sliding surfaces 11 and 21 by the sealing target liquid F flowing out from the vicinity of the leading edge portion 9a between the sliding surfaces 11 and 21 therearound as indicated by an arrow H2. According to this, the liquid film of the sealing target liquid F is formed in the vicinity of the leading edge portions 9a of the plurality of positive pressure generation grooves 15, and thus so-called fluid lubrication occurs between the sliding surfaces 11 and 21, lubricity is improved, and friction reduction is realized. It should be noted that the sealing target liquid F slightly flows out to the downstream side from the point of the positive pressure generation groove 15 other than the leading edge portion 9a.

In addition, since a plurality of the leading edge portions 9a are disposed on the sine wave-shaped virtual curve C as described above, the positive pressure on the sliding surface 11 during the relative rotation of the rotating seal ring 20 is generated at different radial positions along the circumferential direction, the radial pressure gradient on the sliding surface 11 becomes small, and thus the liquid film is likely to be formed substantially uniformly in the wide region of the sliding surface 11. Accordingly, the lubricity of the sliding surface 11 attributable to the sealing target liquid F is improved.

In addition, the sealing target liquid F that has flowed out from the positive pressure generation groove 15 to the land 12 as described above flows into another positive pressure generation groove 15 arranged side by side on the downstream side as compared with the positive pressure generation groove 15 as indicated by an arrow H3. As a result, the internal pressure of the positive pressure generation groove 15 can be stabilized.

As described above, the plurality of leading edge portions 9a arranged side by side in the circumferential direction are disposed at different radial positions at least in part. Accordingly, during the relative rotation of the rotating seal ring 20, the sealing target liquid F flows to the relative rotation-direction downstream side of each positive pressure generation groove 15 and concentrates on the leading edge portion 9a, leading to positive pressure generation. Since the leading edge portions 9a of the positive pressure generation grooves 15 are disposed at different radial positions at least in part, the positive pressure on the sliding surface 11 is generated at different radial positions along the circumferential direction. Since the radial pressure gradient on the sliding surface 11 becomes small, the liquid film is likely to be formed substantially uniformly in the wide region of the sliding surface 11. Accordingly, the lubricity of the sliding surface 11 attributable to the sealing target liquid F is improved.

In addition, the plurality of leading edge portions 9a arranged side by side are regularly disposed along the circumferential direction. As a result, the fluid film of the sealing target liquid F is formed at regularly disposed positions during the relative rotation of the rotating seal ring 20, and thus the lubricity is improved.

In addition, the radial positions of the plurality of leading edge portions 9a arranged side by side gradually change along the circumferential direction and the leading edge portions 9a are disposed in a wave shape. As a result, the liquid film of the sealing target liquid F is formed in a wave shape during the relative rotation of the rotating seal ring 20, and thus the lubricity is improved.

In addition, the positive pressure generation groove 15 has the opening portion 15a communicating with the sealing target liquid side. As a result, during the relative rotation of the rotating seal ring 20, the sealing target liquid F is easily introduced from the sealing target liquid side in the leading edge portion 9a of the positive pressure generation groove 15, and thus the liquid film of the sealing target liquid F is easily formed in the leading edge portion 9a and the lubricity of the sliding surface 11 is improved.

Second Embodiment

Next, the sliding component according to the second embodiment of the present invention will be described with reference to FIGS. 4 to 7. It should be noted that configurations identical to those of the first embodiment will not be described below so that redundancy can be avoided.

Figure 4:
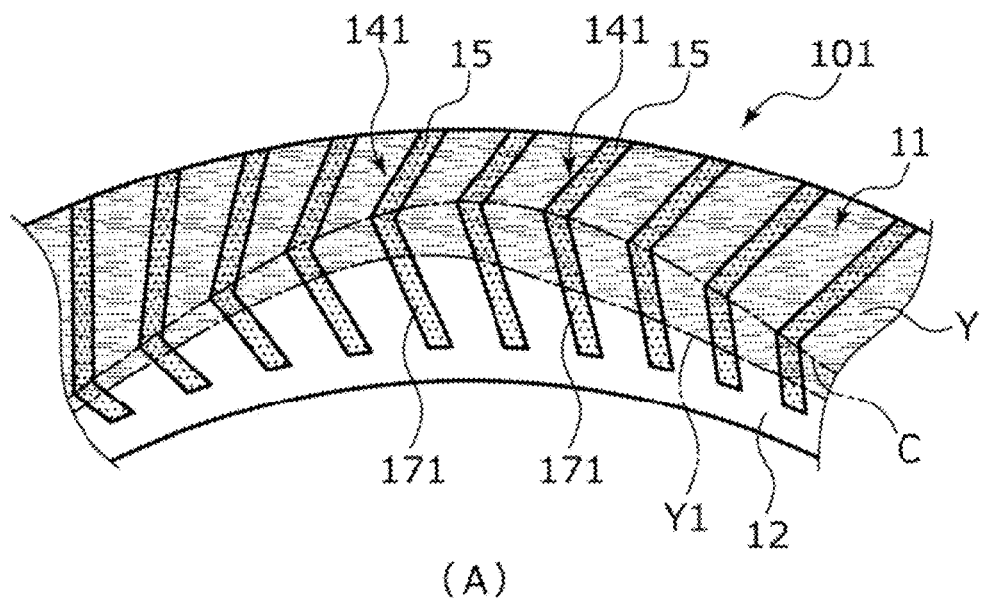
FIG. 4 is a diagram in which the sliding surface of the stationary seal ring as a sliding component according to a second embodiment of the present invention is viewed from the axial direction.
Figure 5:
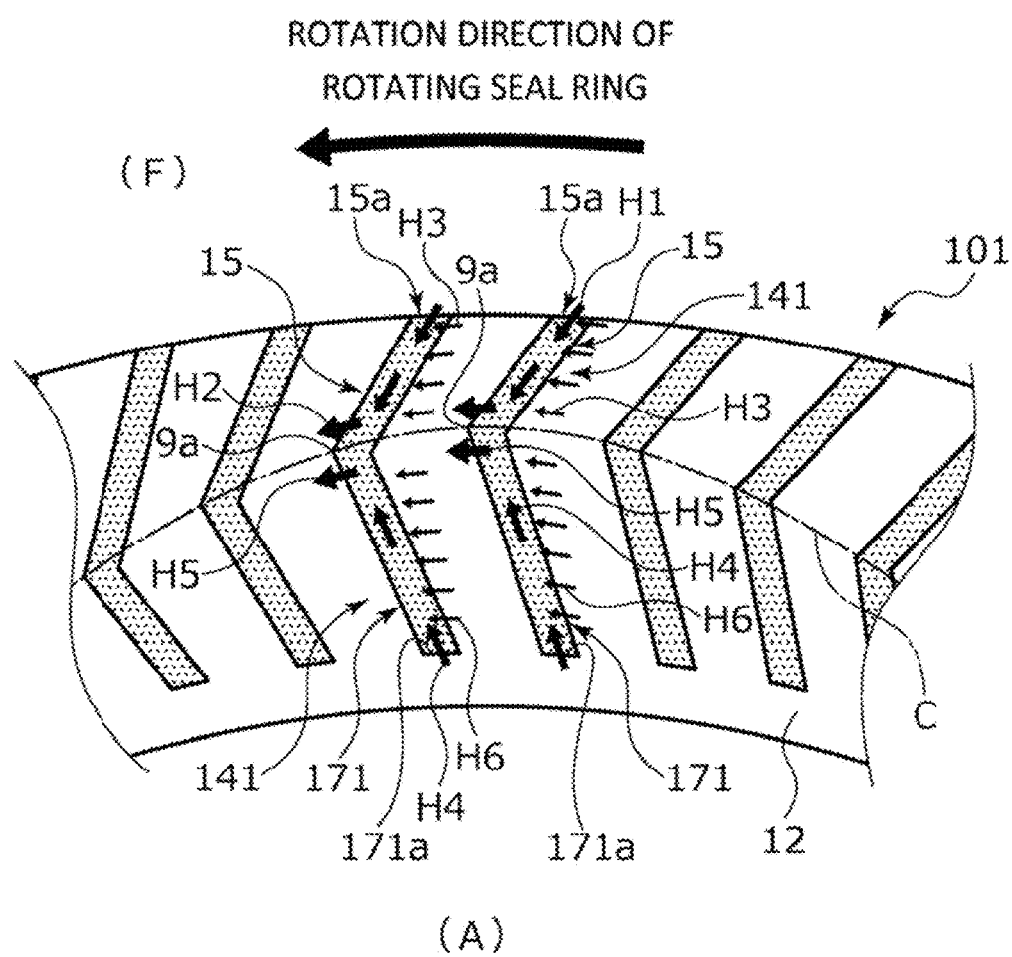
FIG. 5 is an enlarged view of a main part of the sliding surface of the stationary seal ring during relative rotation in the second embodiment.

As illustrated in FIGS. 4 and 5, on the sliding surface 11 of a stationary seal ring 101, a plurality of dynamic pressure generation mechanisms 141 forming a V shape with tip portions facing downstream are evenly arranged in the circumferential direction of the stationary seal ring 101. The side that is open to and communicates with the sealing target liquid side as one of the two sides constituting the V shape of the dynamic pressure generation mechanism 141 corresponds to the positive pressure generation groove 15 inclined to the downstream side while facing the atmospheric side and linearly recessed. The other side continuous with the positive pressure generation groove 15 corresponds to a negative pressure generation groove 171 inclined to the upstream side while facing the atmospheric side and linearly recessed to an atmosphere-side end portion 171a blocked as a leak-side end portion. In addition, the tip portion where the two sides of the V shape intersect corresponds to the leading edge portion 9a. In addition, the radial positions of the leading edge portions 9a of the plurality of positive pressure generation grooves 15 arranged side by side gradually change along the circumferential direction and the leading edge portions 9a are disposed on the smooth and continuous virtual curve C having a sine wave shape over the circumferential direction.

Next, the operation of the rotating seal ring 20 during the relative rotation will be described. First, during the non-operation of a general industrial machine and non-rotation of the rotating seal ring 20, capillarity causes the sealing target liquid F on the sealing target liquid side as compared with the sliding surfaces 11 and 21 to slightly enter between the sliding surfaces 11 and 21 and the dynamic pressure generation mechanism 141 is filled with the sealing target liquid F that has flowed in from the opening portion 15a of the positive pressure generation groove 15. It should be noted that the sealing target liquid F is higher in viscosity than a gas and thus the amount of leakage from the dynamic pressure generation mechanism 141 to the atmospheric side is extremely small when the general industrial machine is stopped.

Next, when the rotating seal ring 20 rotates with respect to the stationary seal ring 101 as illustrated in FIG. 5, the flow of the sealing target liquid F on the sealing target liquid side introduced from the opening portion 15a of the positive pressure generation groove 15 toward the leading edge portion 9a is generated as indicated by the arrow H1. Accordingly, dynamic pressure is generated in the positive pressure generation groove 15. It should be noted that the positive pressure in the positive pressure generation groove 15 gradually increases from the opening portion 15a side, which is the upstream side, toward the leading edge portion 9a on the downstream side.

In other words, the pressure is highest in the vicinity of the leading edge portion 9a positioned at the downstream-side leading edge of the positive pressure generation groove 15, the sliding surfaces 11 and 21 are separated from each other, and a liquid film of the sealing target liquid F is formed on the sealing target liquid side between the sliding surfaces 11 and 21 by the sealing target liquid F flowing out from the vicinity of the leading edge portion 9a between the sliding surfaces 11 and 21 therearound as indicated by the arrow H2. According to this, the liquid film of the sealing target liquid F is formed in the vicinity of the leading edge portions 9a of the plurality of positive pressure generation grooves 15, and thus so-called fluid lubrication occurs between the sliding surfaces 11 and 21, lubricity is improved, and friction reduction is realized. It should be noted that the sealing target liquid F slightly flows out to the downstream side from the point of the positive pressure generation groove 15 other than the leading edge portion 9a.

In addition, since the plurality of leading edge portions 9a are disposed on the sine wave-shaped virtual curve C as described above, the positive pressure on the sliding surface 11 during the relative rotation of the rotating seal ring 20 is generated at different radial positions along the circumferential direction, the radial pressure gradient on the sliding surface 11 becomes small, and thus the liquid film is likely to be formed substantially uniformly in the wide region of the sliding surface 11. Accordingly, the lubricity of the sliding surface 11 attributable to the sealing target liquid F is improved.

In addition, the sealing target liquid F that has flowed out from the positive pressure generation groove 15 to the land 12 as described above flows into another positive pressure generation groove 15 arranged side by side on the downstream side as compared with the positive pressure generation groove 15 as indicated by the arrow H3. As a result, the internal pressure of the positive pressure generation groove 15 can be stabilized.

Next, the negative pressure generation groove 171 during the relative rotation of the rotating seal ring 20 will be described. When the rotating seal ring 20 rotates with respect to the stationary seal ring 10, negative dynamic pressure is generated in the negative pressure generation groove 171. With the sealing target liquid F introduced into the atmosphere-side end portion 171a side of the negative pressure generation groove 171, the flow of the sealing target liquid F introduced from the atmosphere-side end portion 171a of the negative pressure generation groove 171 toward the leading edge portion 9a is generated as indicated by an arrow H4. It should be noted that the positive pressure in the negative pressure generation groove 171 gradually increases from the atmosphere-side end portion 171a side, which is the upstream side, toward the downstream side and the atmosphere-side end portion 171a has a relatively negative pressure.

In other words, the pressure is highest in the vicinity of the leading edge portion 9a, the sliding surfaces 11 and 21 are separated from each other, and a liquid film of the sealing target liquid F is formed on the sealing target liquid side between the sliding surfaces 11 and 21 by the sealing target liquid F flowing out from the vicinity of the leading edge portion 9a between the sliding surfaces 11 and 21 therearound as indicated by an arrow H5. Then, the sealing target liquid F flowing out of the liquid film flows to the negative pressure generation groove 171 of another dynamic pressure generation mechanism 141 adjacent to the downstream side. In this manner, the sealing target liquid F once introduced from the opening portion 15a is circulated in the circumferential direction between the plurality of dynamic pressure generation mechanisms 141, and thus the sealing target liquid F can be prevented from leaking to the atmospheric side.

In addition, as described above, the sealing target liquid F is circulated in the circumferential direction between the plurality of dynamic pressure generation mechanisms 141 during the relative rotation of the plurality of leading edge portions 9a disposed on the sine wave-shaped virtual curve C. As a result, a gas-liquid interface Y1 between an atmosphere A and the sealing target liquid F on the sliding surface 11 is formed in a substantially sine wave shape on the atmospheric side as compared with the virtual curve C and a liquid film forming region Y (indicated by linear hatching in FIG. 4) is formed on the sealing target liquid side including the positive pressure generation groove 15 and a part of the negative pressure generation groove 171 (see FIG. 4). It should be noted that the surrounding sealing target liquid F is suctioned in by the relative negative pressure being generated on the atmosphere-side end portion 171a side of the negative pressure generation groove 171 and thus the sealing target liquid F that is to leak out to the atmospheric side can be returned to the sealing target liquid F side, which is the outer diameter side. In addition, it is a matter of course that the position of the gas-liquid interface Y1 and the range of the liquid film forming region Y vary from the position illustrated in FIG. 4 depending on, for example, the rotation speed of the rotating seal ring 20 during the relative rotation and the pressure of the sealing target liquid F.

In addition, the sealing target liquid F that has flowed out from the negative pressure generation groove 171 to the land 12 as described above flows into another negative pressure generation groove 171 arranged side by side on the downstream side as compared with the negative pressure generation groove 171 as indicated by an arrow H6. As a result, the internal pressure of the negative pressure generation groove 171 can be stabilized.

The positive pressure generation groove 15 extends at an angle to the downstream side while facing the atmospheric side as described above, and the sliding surface is provided with the negative pressure generation groove 171 extending continuously from the atmosphere-side end portion 9b of the positive pressure generation groove 15 and at an angle to the upstream side while facing the atmospheric side. In this respect, during the relative rotation of the rotating seal ring 20, the liquid film of the sealing target liquid F formed in the leading edge portion 9a is suctioned in by the negative pressure generation groove 171 with a relatively negative pressure, and thus it is possible to prevent the sealing target liquid F from leaking to the atmospheric side and improve the sealability of the stationary seal ring 10 and the rotating seal ring 20.

In addition, the land 12 is provided on the leak side of the sliding surface 11 as compared with the negative pressure generation groove 171 so as to be continuous over the circumferential direction, that is, in an annular shape. As a result, the atmosphere-side end portion 171a of the negative pressure generation groove 171 is blocked by the land 12, and thus it is possible to prevent the sealing target liquid F from leaking to the atmospheric side when the rotating seal ring 20 is stationary.

In addition, the land 12 on the atmospheric side as compared with the negative pressure generation groove 171 has a constant radial width over the circumferential direction. As a result, the radial position of the atmosphere-side end portion 171a of the negative pressure generation groove 171 is constant over the circumferential direction, and thus manufacturing is facilitated.

Figure 6:
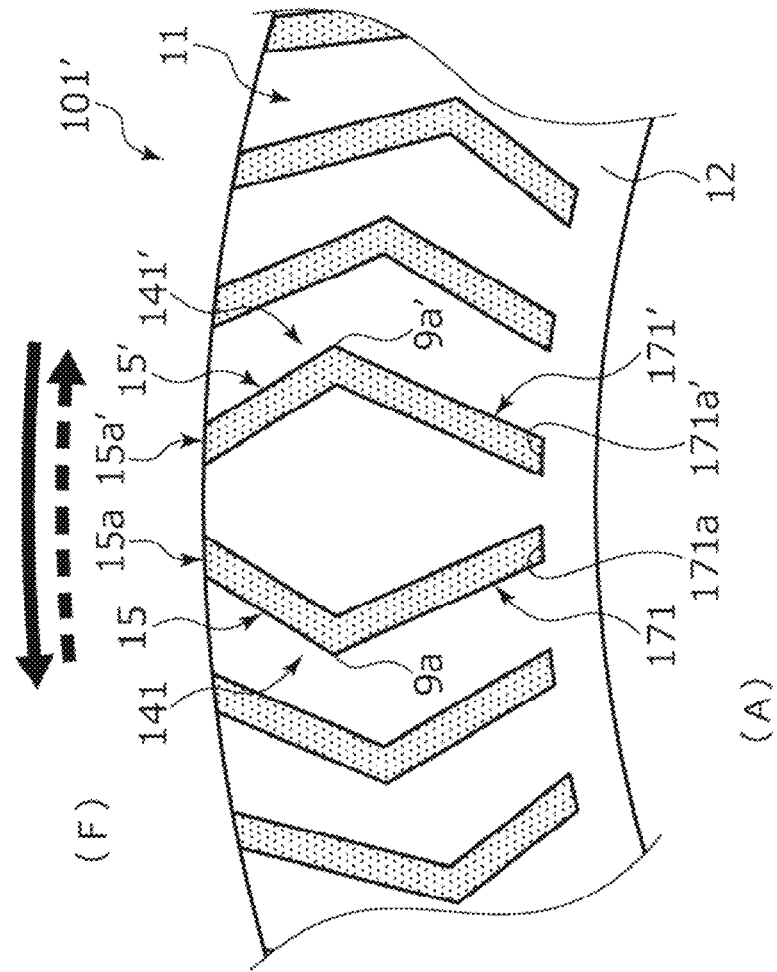
FIG. 6 is an explanatory diagram illustrating a first modification example of the second embodiment of present invention.

Next, a modification example of the present embodiment will be described. It should be noted that configurations identical to those of the above embodiment will not be described below so that redundancy can be avoided. As illustrated in FIG. 6, in a first modification example, the sliding surface 11 of a stationary seal ring 101' is provided with a plurality of reverse dynamic pressure generation mechanisms 141', which have tip portions facing the side opposite to the dynamic pressure generation mechanisms 141, as well as the dynamic pressure generation mechanisms 141 arranged side by side in the circumferential direction. The reverse dynamic pressure generation mechanism 141' has a substantially identical structure in which the dynamic pressure generation mechanism 141 is inverted in the circumferential direction. The side that is open to and communicates with the sealing target liquid side as one of the two sides constituting the V shape of the reverse dynamic pressure generation mechanism 141' corresponds to a reverse positive pressure generation groove 15' inclined to the side opposite to the positive pressure generation groove 15 while facing the atmospheric side and linearly recessed. The other side recessed so as to be continuous with the reverse positive pressure generation groove 15' corresponds to a reverse negative pressure generation groove 171' inclined to the side opposite to the negative pressure generation groove 171 while facing the atmospheric side and linearly recessed to an atmosphere-side end portion 171a' blocked as the leak side. In addition, the tip portion where the two sides of the V shape intersect corresponds to a reverse leading edge portion 9a'.

In a case where the rotating seal ring 20 rotates in the counterclockwise direction of the page indicated by the solid-line arrow in FIG. 6, that is, forward, the sealing target liquid F introduced from the opening portion 15a follows and moves to the downstream side in the positive pressure generation groove 15. This leads to positive pressure generation and liquid film formation in the leading edge portion 9a. In the negative pressure generation groove 171, the introduced sealing target liquid F follows and moves to the downstream side, leading to relative negative pressure generation on the atmosphere-side end portion 171a side. In addition, in a case where the rotating seal ring 20 rotates in the clockwise direction of the page indicated by the dotted-line arrow in FIG. 6, that is, reversely, the sealing target liquid F introduced from an opening portion 15a' follows and moves to the downstream side in the reverse rotation occasion in the reverse positive pressure generation groove 15'. This leads to positive pressure generation and liquid film formation in the reverse leading edge portion 9a'. In the reverse negative pressure generation groove 171', the introduced sealing target liquid F follows and moves to the downstream side in the reverse rotation occasion, leading to relative negative pressure generation on the atmosphere-side end portion 171a' side. In other words, in a case where the rotating seal ring 20 rotates in the clockwise direction of the page of FIG. 6, the reverse positive pressure generation groove 15' functions as a positive pressure generation groove and the reverse negative pressure generation groove 171' functions as a negative pressure generation groove.

As described above, the sliding surface 11 of the stationary seal ring 101' includes the dynamic pressure generation mechanism 141 having a tip portion facing the downstream side in the relative rotation direction in the forward rotation occasion and the reverse dynamic pressure generation mechanism 141' having a tip portion facing the downstream side in the relative rotation direction in the reverse rotation occasion. Accordingly, use is possible regardless of the direction in which the stationary seal ring 101 and the rotating seal ring 20 rotate relative to each other.

Figure 7:
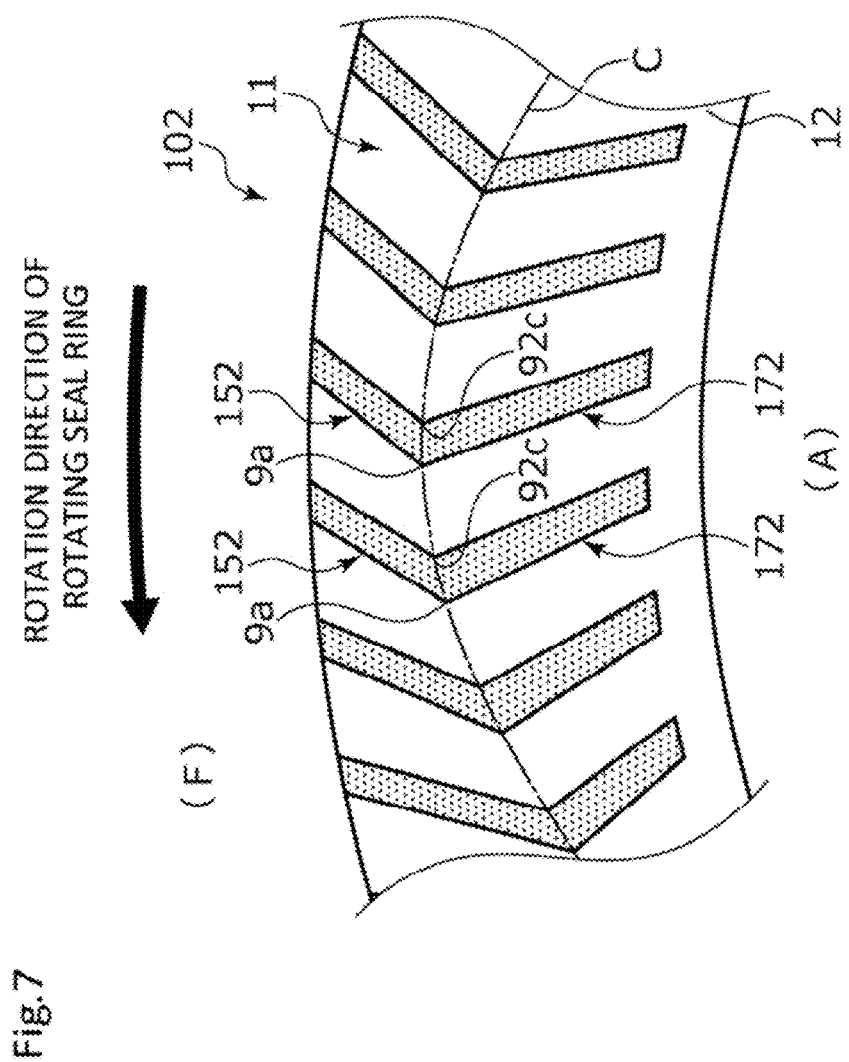
FIG. 7 is an explanatory diagram illustrating a second modification example of the second embodiment.

Next, a second modification example will be described. As illustrated in FIG. 7, on the sliding surface 11 of a stationary seal ring 102, the plurality of leading edge portions 9a arranged side by side and a plurality of bent portions 92c on the upstream side where a positive pressure generation groove 152 and a negative pressure generation groove 172 intersect have radial positions gradually changing along the circumferential direction and are disposed on the sine wave-shaped virtual curve C, and thus manufacturing is facilitated.

Third Embodiment

Third Embodiment

Next, the sliding component according to the third embodiment of the present invention will be described with reference to FIGS. 8 to 11. It should be noted that configurations identical to those of the second embodiment will not be described below so that redundancy can be avoided.

Figure 8:
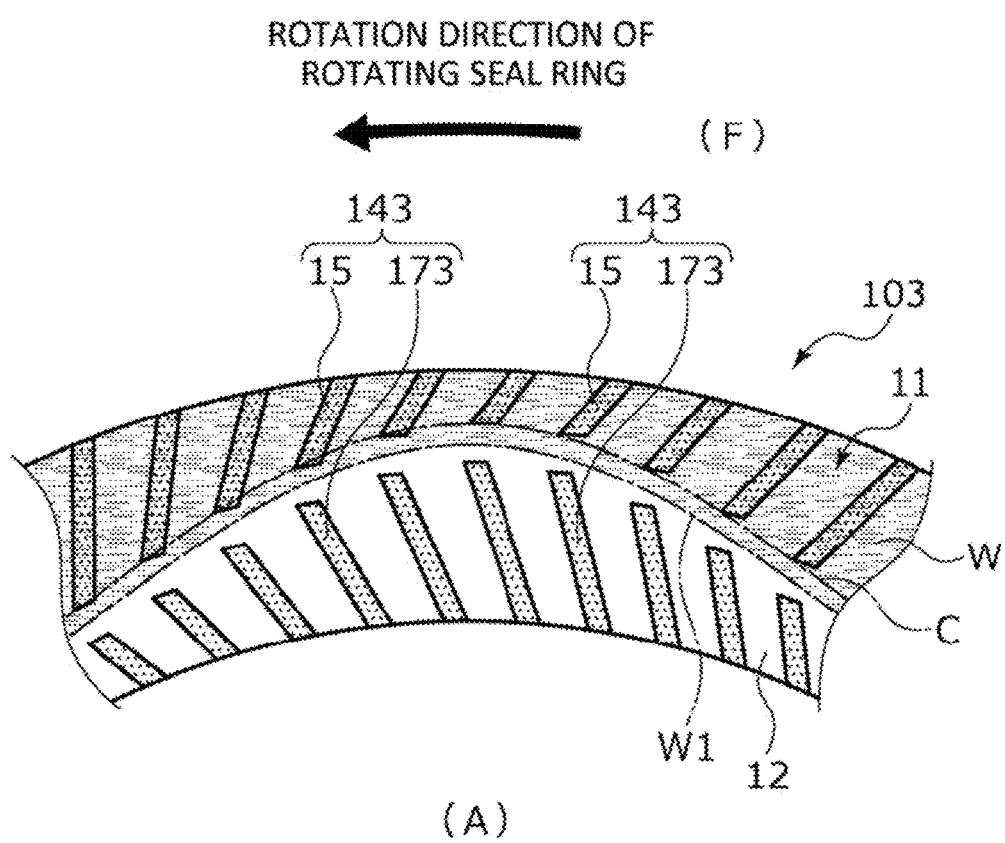
FIG. 8 is a diagram in which the sliding surface of the stationary seal ring as a sliding component according to a third embodiment of the present invention is viewed from the axial direction.
Figure 9:
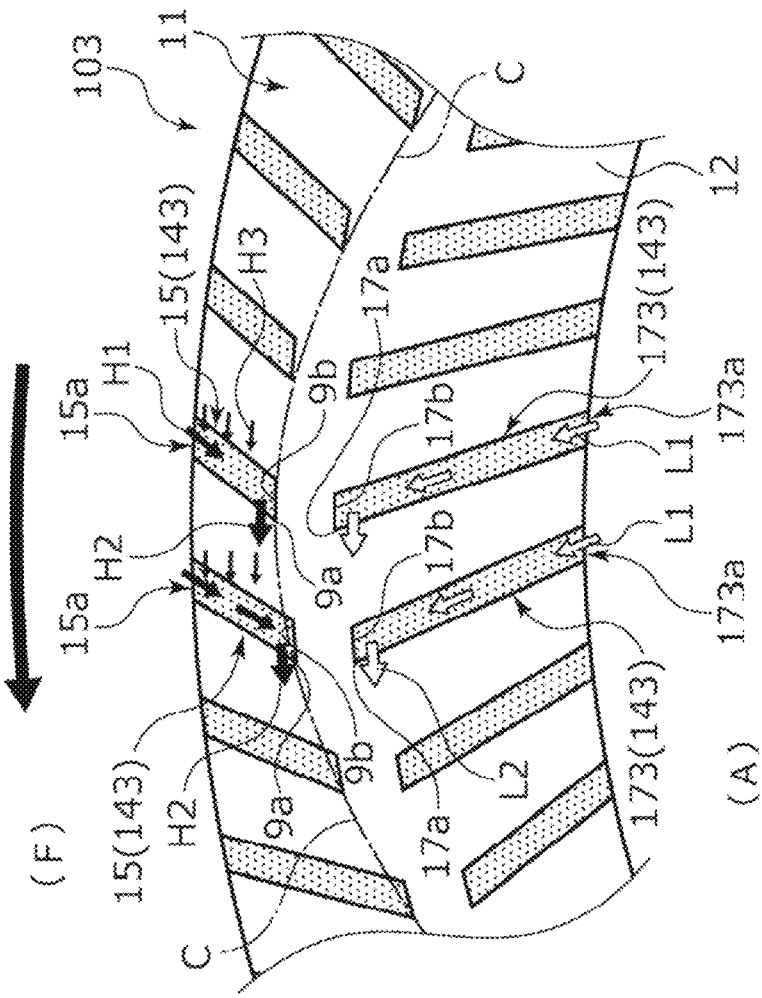
FIG. 9 is an enlarged view of a main part of the sliding surface of the stationary seal ring during relative rotation in the third embodiment.
Figure 10:
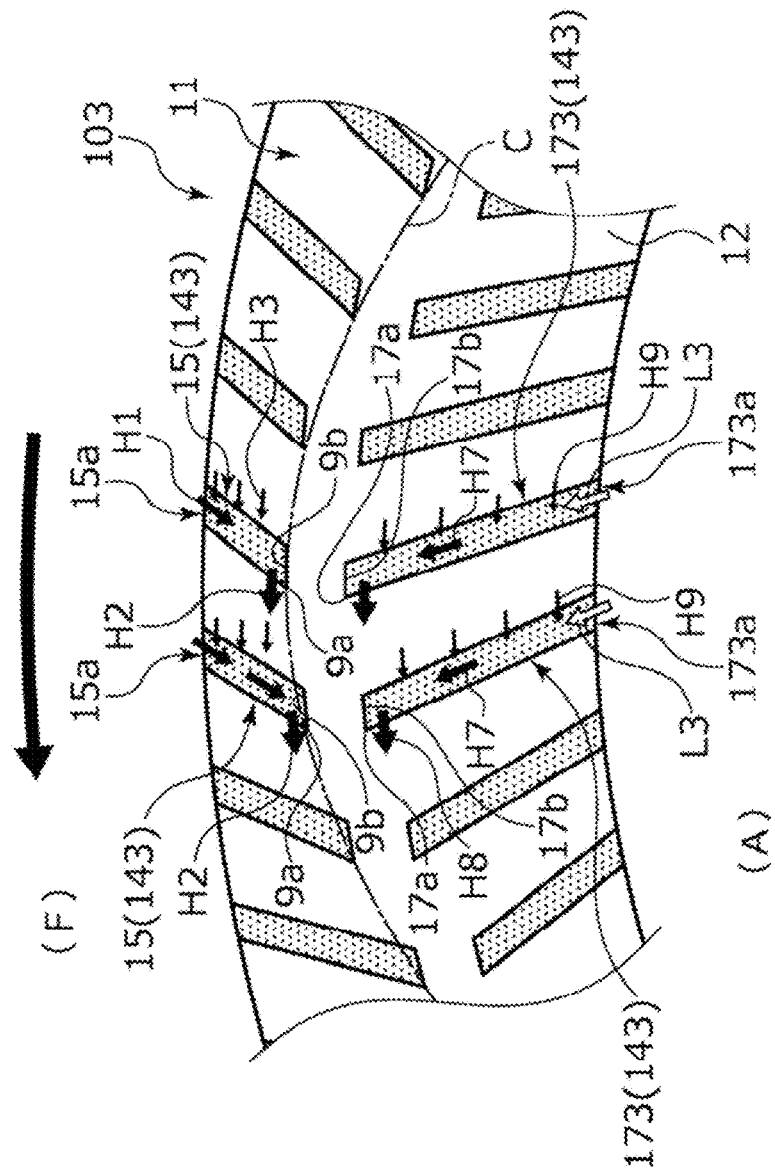
FIG. 10 is an enlarged view of a main part at a time when a sealing target liquid has entered second positive pressure generation groove on the sliding surface of the stationary seal ring during the relative rotation in the third embodiment.

As illustrated in FIGS. 8 to 10, a plurality of dynamic pressure generation mechanisms 143 are evenly arranged in the circumferential direction on the sliding surface 11 of a stationary seal ring 103 and the dynamic pressure generation mechanism 143 includes the positive pressure generation groove 15 extending at an angle to the downstream side while facing the atmospheric side and a second positive pressure generation groove 173 independent of the positive pressure generation groove 15 and extending at an angle to the upstream side while facing the atmospheric side. It should be noted that the number of the second positive pressure generation grooves 173 is equal to the number of the positive pressure generation grooves 15 and the second positive pressure generation grooves 173 are disposed in a corresponding manner so as to be positioned on the same radius. However, the present invention is not limited thereto and the number or position may not correspond.

The positive pressure generation groove 15 is provided with the opening portion 15a open to and communicating with the sealing target liquid side and is linearly recessed to the blocked atmosphere-side end portion 9b. The leading edge portion 9a is disposed at the downstream-side leading edge of the atmosphere-side end portion 9b. In addition, the radial positions of the leading edge portions 9a of the plurality of positive pressure generation grooves 15 arranged side by side gradually change along the circumferential direction and the leading edge portions 9a are disposed on the smooth and continuous virtual curve C having a sine wave shape over the circumferential direction.

The second positive pressure generation groove 173 is provided with an opening portion 173a open to and communicating with the atmospheric side and is linearly recessed to a blocked sealing target liquid-side end portion 17b. The leading edge portion 9a is disposed at the downstream-side leading edge of the sealing target liquid-side end portion 17b. In addition, the radial width of the land 12 provided between the positive pressure generation groove 15 and the second positive pressure generation groove 173 in the radial direction is constant over the circumferential direction.

Next, the operation of the rotating seal ring 20 during the relative rotation will be described. It should be noted that the operation in the positive pressure generation groove 15 is similar to those of the first and second embodiments and thus redundant description will be omitted unless otherwise specified.

First, during the non-operation of a general industrial machine and non-rotation of the rotating seal ring 20, capillarity causes the sealing target liquid F on the sealing target liquid side as compared with the sliding surfaces 11 and 21 to slightly enter between the sliding surfaces 11 and 21 and the dynamic pressure generation mechanism 143 is filled with the sealing target liquid F that has flowed in from the opening portion 15a of the positive pressure generation groove 15. It should be noted that the sealing target liquid F is higher in viscosity than a gas and thus the amount of leakage from the dynamic pressure generation mechanism 143 to the atmospheric side is extremely small when the general industrial machine is stopped.

Next, when the rotating seal ring 20 rotates with respect to the stationary seal ring 103 as illustrated in FIGS. 9 and 10, the flow of the sealing target liquid F on the sealing target liquid side introduced from the opening portion 15a of the positive pressure generation groove 15 toward the leading edge portion 9a is generated as indicated by the arrow H1. Accordingly, dynamic pressure is generated in the positive pressure generation groove 15. It should be noted that the positive pressure in the positive pressure generation groove 15 gradually increases from the opening portion 15a side, which is the upstream side, toward the leading edge portion 9a on the downstream side.

In other words, the pressure is highest in the vicinity of the leading edge portion 9a positioned at the downstream-side leading edge of the positive pressure generation groove 15, the sliding surfaces 11 and 21 are separated from each other, and a liquid film of the sealing target liquid F is formed on the sealing target liquid side between the sliding surfaces 11 and 21 by the sealing target liquid F flowing out from the vicinity of the leading edge portion 9a between the sliding surfaces 11 and 21 therearound as indicated by the arrow H2. According to this, the liquid film of the sealing target liquid F is formed in the vicinity of the leading edge portions 9a of the plurality of positive pressure generation grooves 15, and thus so-called fluid lubrication occurs between the sliding surfaces 11 and 21, lubricity is improved, and friction reduction is realized. It should be noted that the sealing target liquid F slightly flows out to the downstream side from the point of the positive pressure generation groove 15 other than the leading edge portion 9a.

In addition, since the plurality of leading edge portions 9a are disposed on the sine wave-shaped virtual curve C as described above, the positive pressure on the sliding surface 11 during the relative rotation of the rotating seal ring 20 is generated at different radial positions along the circumferential direction, the radial pressure gradient on the sliding surface 11 becomes small, and thus the liquid film is likely to be formed substantially uniformly in the wide region of the sliding surface 11. Accordingly, the lubricity of the sliding surface 11 attributable to the sealing target liquid F is improved.

In addition, the sealing target liquid F that has flowed out from the positive pressure generation groove 15 to the land 12 as described above flows into another positive pressure generation groove 15 arranged side by side on the downstream side as compared with the positive pressure generation groove 15 as indicated by the arrow H3. As a result, a liquid film having a substantially uniform film thickness is formed in a liquid film forming region W (indicated by linear hatching in FIG. 8).

Next, the second positive pressure generation groove 173 during the relative rotation of the rotating seal ring 20 will be described. As illustrated in FIG. 9, when the rotating seal ring 20 rotates with respect to the stationary seal ring 103, the flow of the atmospheric-side atmosphere A introduced from the opening portion 173a of the second positive pressure generation groove 173 toward a second leading edge portion 17a is generated as indicated by an arrow L1, and thus dynamic pressure is generated in the second positive pressure generation groove 173. It should be noted that the positive pressure in the second positive pressure generation groove 173 gradually increases from the opening portion 173a side, which is the upstream side, toward the second leading edge portion 17a on the downstream side.

In other words, the pressure is highest in the vicinity of the second leading edge portion 17a positioned at the downstream-side leading edge of the second positive pressure generation groove 173, the sliding surfaces 11 and 21 are separated from each other, and the atmosphere A flows out from the vicinity of the second leading edge portion 17a between the sliding surfaces 11 and 21 therearound as indicated by an arrow L2. As a result of this positive pressure generation in the vicinity of the second leading edge portion 17a, it is possible to repel the sealing target liquid F approaching the vicinity of the second leading edge portion from the sealing target liquid side and prevent the sealing target liquid F from leaking to the atmospheric side.

In addition, a liquid film is formed during the relative rotation of the rotating seal ring 20 in the plurality of leading edge portions 9a disposed on the sine wave-shaped virtual curve C as described above and the liquid film is not allowed to enter the atmospheric side by the positive pressure generated by the atmosphere A concentrating on a plurality of the second leading edge portions 17a during the relative rotation of the rotating seal ring 20. Accordingly, a gas-liquid interface W1 between the atmosphere A and the sealing target liquid F on the sliding surface 11 is formed in a sine wave shape between a plurality of the atmosphere-side end portions 9b and a plurality of the sealing target liquid-side end portions 17b and the liquid film forming region W is formed on the sealing target liquid side including the positive pressure generation groove 15 (see FIG. 8). In addition, it is a matter of course that the position of the gas-liquid interface W1 and the range of the liquid film forming region W vary from the position illustrated in FIG. 8 depending on, for example, the rotation speed of the rotating seal ring 20 during the relative rotation and the pressure of the sealing target liquid F.

A case where the sealing target liquid F does not enter the land 12 on the atmospheric side during the relative rotation of the rotating seal ring 20 will be described first. A part of the atmosphere A in the second positive pressure generation groove 173 follows the relative rotation of the rotating seal ring 20 and flows out to the land 12 on the downstream side with its pressure increased. As a result, the gas-liquid interface W1 is maintained between the positive pressure generation groove 15 and the second positive pressure generation groove 173 illustrated in FIG. 8 and the sealing target liquid F to enter the second positive pressure generation groove 173 side is blocked.

Next, a case where the sealing target liquid F has entered the land 12 on the atmospheric side during the relative rotation of the rotating seal ring 20 will be described. As illustrated in FIG. 10, the atmosphere A on the atmospheric side is introduced from the opening portion 173a of the second positive pressure generation groove 173 toward the second leading edge portion 17a as indicated by an arrow L3. In addition, the sealing target liquid F is introduced from the land 12 as indicated by an arrow H9 and merges with the flow of the atmosphere A indicated by the arrow L3, the flow of the sealing target liquid F toward the second leading edge portion 17a indicated by an arrow H7 is generated, and dynamic pressure is generated in the second positive pressure generation groove 173. It should be noted that the positive pressure in the second positive pressure generation groove 173 gradually increases from the opening portion 173a side, which is the upstream side, toward the second leading edge portion 17a on the downstream side as in the case of FIG. 9.

In other words, the pressure is highest in the vicinity of the second leading edge portion 17a positioned at the downstream-side leading edge of the second positive pressure generation groove 173 and the sealing target liquid F flows out from the vicinity of the second leading edge portion 17a between the sliding surfaces 11 and 21 therearound as indicated by an arrow H8. In this manner, it is possible to return the sealing target liquid F that has entered the land 12 to the sealing target liquid side, which is the outer diameter side, and prevent the sealing target liquid F from leaking to the atmospheric side. It should be noted that the sealing target liquid F is incompressible and high in viscosity as compared with the atmosphere and thus the sealing target liquid F that has entered the second positive pressure generation groove 173 easily flows out between the sliding surfaces 11 and 21 as the rotating seal ring 20 is relatively rotated.

As described above, the second positive pressure generation groove 173 is provided that is independent of the positive pressure generation groove 15 on the atmospheric side as compared with the positive pressure generation groove 15 and generates positive pressure by the atmosphere on the atmospheric side as compared with the positive pressure generation groove 15 being introduced during the relative rotation of the rotating seal ring 20. The second positive pressure generation groove 173 is provided with the second leading edge portion 17a at the leading edge on the downstream side in the relative rotation direction. In this respect, during the relative rotation of the rotating seal ring 20, the atmosphere on the atmospheric side flows to the downstream side of the second positive pressure generation groove 173 and concentrates on the second leading edge portion 17a to lead to positive pressure generation, and thus it is possible to repel the sealing target liquid F approaching the vicinity of the second leading edge portion 17a from the sealing target liquid side and prevent the sealing target liquid F from leaking to the atmospheric side.

In addition, since the second positive pressure generation grooves 173 are disposed so as to correspond in number and position to the positive pressure generation grooves 15, the second positive pressure generation grooves 173 can be machined in accordance with the number and positions of the positive pressure generation grooves 15 and are easy to manufacture.

In addition, since 12 is provided in an annular shape between the positive pressure generation groove 15 and the second positive pressure generation groove 173 in the radial direction, the positive pressure generation groove 15 and the second positive pressure generation groove 173 can be separated from each other and the functions of both during the relative rotation can be clarified.

In addition, since the radial width of the land 12 provided between the positive pressure generation groove 15 and the second positive pressure generation groove 173 in the radial direction is constant over the circumferential direction, the second leading edge portion 17a is separated from the leading edge portion 9a to the leak side by a constant dimension. The second leading edge portion 17a where positive pressure is generated during the relative rotation is disposed at positions with different diameter lengths in the circumferential direction, and thus it is possible to prevent the sealing target liquid F flowing from the liquid film generated in the leading edge portion 9a during the relative rotation from entering the atmospheric side.

Figure 11:
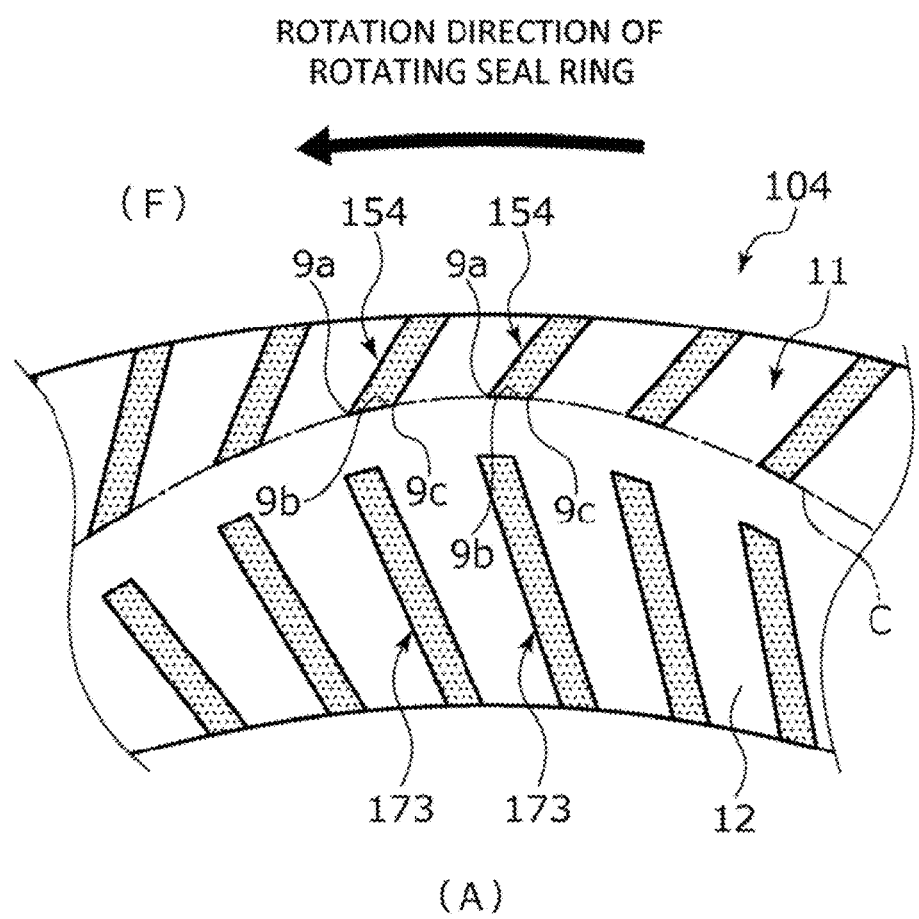
FIG. 11 is an explanatory diagram illustrating a third modification example of the first to third embodiment.

Next, a modification example will be described. It should be noted that configurations identical to those of the above embodiment will not be described below so that redundancy can be avoided. As illustrated in FIG. 11, on the sliding surface 11 of a stationary seal ring 104 in a third modification example, the plurality of leading edge portions 9a arranged side by side and the corner portion 9c positioned on the upstream side of the atmosphere-side end portion 9b of a positive pressure generation groove 154 have radial positions gradually changing along the circumferential direction and are disposed on the sine wave-shaped virtual curve C, and thus manufacturing is facilitated.

Although embodiments of the present invention have been described above with reference to the drawings, the specific configuration is not limited to the embodiments and any change or addition within the scope of the gist of the present invention is included in the present invention.

For example, although the mechanical seal for general industrial machine has been described as an example of the sliding component in the above embodiments, the mechanical seal may be replaced with another mechanical seal for an automobile, a water pump, or the like. In addition, the present invention is not limited to the mechanical seal and may be a sliding component other than a mechanical seal, examples of which include a slide bearing.

In addition, although an example in which the dynamic pressure generation mechanism is provided only on the stationary seal ring 10 has been described in the above embodiment, the dynamic pressure generation mechanism may be provided only on the rotating seal ring 20 or on both the stationary and rotating seal rings.

In addition, although the leading edge portion 9a and the corner portion 9c or the bent portion 92c are disposed on the smooth, continuous, and sine wave-shaped virtual curve C in the above embodiment, the present invention is not limited thereto. For example, the virtual curve may be wavy with a small period or have a rectangular wave shape.

In addition, although the positive pressure generation groove 15, the negative pressure generation groove, the reverse positive pressure generation groove 15', the reverse negative pressure generation groove 171', and the second positive pressure generation groove 173 are linearly recessed in the above embodiments, the present invention is not limited thereto. For example, the positive pressure generation groove 15, the negative pressure generation groove, the reverse positive pressure generation groove 15', the reverse negative pressure generation groove 171', and the second positive pressure generation groove 173 may be recessed in a curved shape.

In addition, although the positive pressure generation groove is provided with the opening portion 15a open to and communicating with the sealing target liquid side in the above description, the present invention is not limited thereto and the positive pressure generation groove may be blocked without opening.

In addition, although the second positive pressure generation groove 173 is provided with the opening portion 173a open to and communicating with the atmospheric side in the above description, the present invention is not limited thereto and the second positive pressure generation groove 173 may be blocked without opening.

REFERENCE SIGNS LIST

1 Rotary shaft
2 Sleeve
4 Housing
5 Seal cover
7 Bellows
9a Leading edge portion
9b Atmosphere-side end portion (leak-side end portion)
9c Corner portion
10 Stationary seal ring (sliding component)
11 Sliding surface
12 Land
14 Dynamic pressure generation mechanism
15 Positive pressure generation groove
15a Opening portion
17a Second leading edge portion
20 Rotating seal ring (sliding component)
21 Sliding surface
92c Bent portion
171 Negative pressure generation groove
173 Second positive pressure generation groove

The invention claimed is:

1. A shaft sealing device comprising a pair of sliding components formed in an annular shape and disposed at a relative rotation point of a rotating machine, one of the sliding components having a sliding surface provided with a plurality of first positive pressure generation grooves arranged side by side in a circumferential direction, the plurality of first positive pressure generation grooves being configured for generating positive pressure by a sealing target fluid on a sealing target fluid side which is introduced during the relative rotation of the sliding component, the first positive pressure generation grooves having a plurality of leading edge portions at leading edges on a downstream side in a direction of the relative rotation, the plurality of leading edge portions being arranged side by side in the circumferential direction, at least part of the plurality of leading edge portions being disposed so as to be different from each other in radially directional position, the first positive pressure generation grooves extend at an angle to the downstream side in the direction of the relative rotation while facing a leak side, the sliding surface of the one of the sliding components is provided with negative pressure generation grooves each extending so as to be continuous from a leak-side end portion of each of the first positive pressure generation grooves and at an angle to an upstream side in the relative rotation direction while facing the leak side, the plurality of leading edge portions arranged side by side have radial positions gradually changing along the circumferential direction on the sliding surface of the one of the sliding components, the first positive pressure generation grooves have opening portions which are opened to the sealing target fluid side, respectively, a plurality of sealing target fluid side land portions each is formed between adjoining two of the opening portions of the first positive pressure generation grooves, an annular leak side land portion is formed on the leak side as compared with leading edges of the negative pressure generation grooves on the leak side, and the plurality of sealing target fluid side land portions and the annular leak side land portion are equal to each other in height of land.

2. The shaft sealing device according to claim 1, wherein the plurality of leading edge portions arranged side by side are regularly disposed along the circumferential direction.

3. The shaft sealing device according to claim 1, wherein the plurality of leading edge portions arranged side by side are disposed in a wave shape.

4. The shaft sealing device according to claim 1, wherein the annular leak side land portion has a constant radial width over the circumferential direction.

5. The shaft sealing device according to claim 1, wherein the sliding surface is provided with a second positive pressure generation groove independent of the first positive pressure generation groove on a leak side as compared with the first positive pressure generation groove and generating positive pressure by a fluid on the leak side as compared with the first positive pressure generation groove being introduced during the relative rotation of the rotating machine and the second positive pressure generation groove is provided with a leading edge portion at the leading edge on the downstream side in the relative rotation direction.

6. The shaft sealing device according to claim 3, wherein the plurality of leading edge portions arranged side by side and a corner portion positioned on a relative rotation-direction upstream side of a leak-side end portion of the first positive pressure generation groove have radial positions gradually changing along the circumferential direction and are disposed in a wave shape.

7. The shaft sealing device according to claim 2, wherein the plurality of leading edge portions arranged side by side are disposed in a wave shape.

8. The shaft sealing device according to claim 5, wherein the plurality of leading edge portions arranged side by side and a corner portion positioned on a relative rotation-direction upstream side of a leak-side end portion of the first positive pressure generation groove have radial positions gradually changing along the circumferential direction and are disposed in a wave shape.

9. A shaft sealing device comprising a pair of sliding components formed in an annular shape and disposed at a relative rotation point of a rotating machine, one of the sliding components having a sliding surface provided with a plurality of first positive pressure generation grooves arranged side by side in a circumferential direction, the plurality of first positive pressure generation grooves being configured for generating positive pressure by a sealing target fluid on a sealing target fluid side which is introduced during the relative rotation of the sliding component, the first positive pressure generation grooves having a plurality of leading edge portions at leading edges on a downstream side in a direction of the relative rotation, the plurality of leading edge portions being arranged side by side in the circumferential direction, at least part of the plurality of leading edge portions being disposed so as to be different from each other in radially directional position,
- each of the first positive pressure generation grooves extend at an angle to the downstream side in the direction of the relative rotation while extending from the sealing target fluid side toward a leakage side,
- inclined angles of the first positive pressure generation grooves which are adjacent to each other in the circumferential direction are different from each other with respect to the radial direction, the plurality of leading edge portions arranged side by side have radial positions gradually changing along the circumferential direction on the sliding surface of the one of the sliding components, the first positive pressure generation grooves have opening portions which are opened to the sealing target fluid side,
- respectively, a plurality of sealing target fluid side land portions each is formed between adjoining two of the opening portions of the first positive pressure generation grooves, an annular leak side land portion is formed on the leak side as compared with the leading edges of the first positive pressure generation grooves, and the plurality of sealing target fluid side land portions and the annular leak side land portion are equal to each other in height of land.

10. The shaft sealing device according to claim 9, wherein the plurality of leading edge portions arranged side by side are regularly disposed along the circumferential direction.

11. The shaft sealing device according to claim 9, wherein the plurality of leading edge portions arranged side by side are disposed in a wave shape.

12. The shaft sealing device according to claim 9, wherein the sliding surface is provided with a negative pressure generation groove extending so as to be continuous from a leak-side end portion of each of the plurality of first positive pressure generation grooves and at an angle to an upstream side in the relative rotation direction while facing the leak side.

13. The shaft sealing device according to claim 9, wherein the annular leak side land portion has a constant radial width over the circumferential direction.

14. The shaft sealing device according to claim 9, wherein the sliding surface is provided with a second positive pressure generation groove independent of the first positive pressure generation groove on a leak side as compared with the first positive pressure generation groove and generating positive pressure by a fluid on the leak side as compared with the first positive pressure generation groove being introduced during the relative rotation of the rotating machine and the second positive pressure generation groove is provided with a leading edge portion at the leading edge on the downstream side in the relative rotation direction.

15. The shaft sealing device according to claim 14, wherein the second positive pressure generation groove is disposed so as to correspond in number and position to the first positive pressure generation groove.

16. The shaft sealing device according to claim 15, wherein a land portion extending over the circumferential direction is provided between the first positive pressure generation groove and the second positive pressure generation groove in the radial direction.

17. The shaft sealing device according to claim 16, wherein the land portion provided between the first positive pressure generation groove and the second positive pressure generation groove in the radial direction has a radial width constant over the circumferential direction.

18. The shaft sealing device according to claim 11, wherein the plurality of leading edge portions arranged side by side and a corner portion positioned on a relative rotation-direction upstream side of a leak-side end portion of the first positive pressure generation groove have radial positions gradually changing along the circumferential direction and are disposed in a wave shape.

19. A shaft sealing device comprising a pair of sliding components formed in an annular shape and disposed at a relative rotation point of a rotating machine, one of the sliding components having a sliding surface provided with a plurality of first positive pressure generation grooves arranged side by side in a circumferential direction,
- the plurality of first positive pressure generation grooves being configured for generating positive pressure by a sealing target fluid on a sealing target fluid side which is introduced during the relative rotation of the sliding component,
- the first positive pressure generation grooves having a plurality of first leading edge portions at leading edges on a downstream side in a direction of the relative rotation,
- the plurality of first leading edge portions being arranged side by side in the circumferential direction,
- at least part of the plurality of first leading edge portions being disposed at different radial positions,
- wherein the sliding surface is further provided with a plurality of second positive pressure generation grooves which are arranged side by side in a circumferential direction, which are independent of the first positive pressure generation grooves on a leak side as compared with the first positive pressure generation grooves and which generate positive pressure by a fluid on the leak side as compared with the first positive pressure generation grooves, the fluid being introduced during the relative rotation of the rotating machine, each of the second positive pressure generation grooves is provided with a second leading edge portion at a leading edge on the downstream side in the relative rotation direction, and the second leading edge portions are arranged side by side in the circumferential direction and disposed at different radial positions at least in part.

20. The shaft sealing device according to claim 19, wherein the plurality of first leading edge portions arranged side by side are regularly disposed along the circumferential direction.

21. The shaft sealing device according to claim 19, wherein the plurality of first leading edge portions arranged side by side have radial positions gradually changing along the circumferential direction and are disposed in a wave shape.

22. The shaft sealing device according to claim 19, wherein the plurality of second leading edge portions arranged side by side are regularly disposed along the circumferential direction.

23. The shaft sealing device according to claim 22, wherein the plurality of second leading edge portions arranged side by side have radial positions gradually changing along the circumferential direction and are disposed in a wave shape.

24. The shaft sealing device according to claim 19, wherein each of the plurality of first positive pressure generation grooves has an opening portion communicating with the sealing target fluid side.

25. The shaft sealing device according to claim 19, wherein each of the plurality of second positive pressure generation grooves has an opening portion communicating with the leak side.

26. The shaft sealing device according to claim 19, wherein each of the plurality of first positive pressure generation grooves extends at an angle to the downstream side in the relative rotation direction while facing the leak side.

27. The shaft sealing device according to claim 19, wherein each of the plurality of second positive pressure generation grooves extends at an angle to the downstream side in the relative rotation direction while facing the sealing target fluid side.

28. The shaft sealing device according to claim 19, wherein the second positive pressure generation grooves are disposed so as to correspond in number and position to the first positive pressure generation grooves.

29. The shaft sealing device according to claim 19, wherein a land extending over the circumferential direction is provided between the first positive pressure generation grooves and the second positive pressure generation grooves in the radial direction.

30. The shaft sealing device according to claim 29, wherein the land provided between the first positive pressure generation grooves and the second positive pressure generation grooves in the radial direction has a radial width constant over the circumferential direction.

31. The shaft sealing device according to claim 19, wherein the plurality of first leading edge portions arranged side by side and a corner portion positioned on a relative rotation-direction upstream side of a leak-side end portion of the first positive pressure generation groove have radial positions gradually changing along the circumferential direction and are disposed in a wave shape.

* * * * *